US009509784B2

(12) United States Patent
Johns

(10) Patent No.: US 9,509,784 B2
(45) Date of Patent: Nov. 29, 2016

(54) MANIFEST CHUNKING IN CONTENT DELIVERY IN A NETWORK

(71) Applicant: Level 3 Communications, LLC, Broomfield, CO (US)

(72) Inventor: Kevin Christopher Johns, Erie, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 430 days.

(21) Appl. No.: 13/828,251

(22) Filed: Mar. 14, 2013

(65) Prior Publication Data

US 2014/0280746 A1    Sep. 18, 2014

(51) Int. Cl.
*G06F 15/16*    (2006.01)
*H04L 29/08*    (2006.01)

(52) U.S. Cl.
CPC ............... *H04L 67/18* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 6,654,361 B1 | 11/2003 | Dommety | |
| 8,495,675 B1 * | 7/2013 | Philpott et al. | 725/34 |
| 8,532,070 B2 | 9/2013 | Pandian | |
| 8,959,067 B1 * | 2/2015 | Patiejunas | G06F 17/30377 707/696 |
| 2005/0021694 A1 | 1/2005 | Yuan | |
| 2006/0291504 A1 | 12/2006 | Cohn | |
| 2008/0151746 A1 | 6/2008 | Vasseur | |
| 2011/0055316 A1 | 3/2011 | Van der Merwe et al. | |
| 2011/0314130 A1 | 12/2011 | Strasman | |
| 2012/0233228 A1 * | 9/2012 | Barton | H04L 67/06 707/827 |
| 2013/0198328 A1 * | 8/2013 | Green et al. | 709/217 |
| 2014/0074961 A1 * | 3/2014 | Liu et al. | 709/213 |
| 2014/0089465 A1 * | 3/2014 | van Brandenburg | H04L 65/605 709/217 |
| 2014/0215018 A1 * | 7/2014 | Lam | 709/219 |
| 2015/0381678 A1 * | 12/2015 | Fullagar | H04L 65/4084 709/213 |

FOREIGN PATENT DOCUMENTS

WO    WO-2012107788    8/2012

OTHER PUBLICATIONS

International Search Report, dated Oct. 1, 2014, Int'l Appl. No. PCT/US14/026050, Int'l Filing Date Mar. 13, 2014, 6 pgs.
Written Opinion of the International Searching Authority, dated Oct. 1, 2014, Int'l Appl. No. PCT/US14/026050, Int'l Filing Date Mar. 13, 2014, 9 pgs.
U.S. Appl. No. 14/095,495, filed Dec. 3, 2013, "Dynamically Optimizing Content Delivery Using Manifest Chunking".
International Preliminary Report on Patentability, dated Sep. 15, 2015, Int'l Appl. No. PCT/US14/026050, Int'l Filing Date Mar. 13, 2014, 11 pgs.

\* cited by examiner

*Primary Examiner* — Thomas Dailey

(57) ABSTRACT

Implementations described and claimed herein provide a system and methods for dynamic re-localization and manifest chunking in a content delivery network. In one implementation, a request for content is received. A first manifest subset is provided using a network component in response to the request for content. The first manifest subset identifies a first set of one or more content segments and a second manifest subset. The first set of one or more content segments constitute a portion of the content, and the second manifest subset is identified at a tail of the first manifest subset. The first set of one or more content segments is served in response to separate requests. A request for the second manifest subset identifying a second set of one or more content segments is received. In another implementation, localization errors are remedied by replacing a relative identifier with an absolute identifier.

19 Claims, 6 Drawing Sheets

MANIFEST CHUNKING IN CONTENT DELIVERY IN A NETWORK

TECHNICAL FIELD

Aspects of the present disclosure relate to content distribution and delivery in a network, and more particularly to dynamic re-localization and manifest chunking in a content delivery network.

BACKGROUND

Content Delivery Networks (CDN) are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, the end users obtain the content with fewer delays. However, many CDNs are generally not configured to efficiently deliver content in a mobile environment, particularly as a user changes locations or networks while consuming the content.

In the past, users tended to consume higher quality, larger sized content (e.g., a movie) primarily via an access network, for example, using a wifi access point. In general, user devices are configured to prefer using the access network over a cellular network, where available, for data exchange to decrease capacity on cellular networks. However, as portable user devices, such as phones and tablets, have become capable of consuming higher quality content, users have come to expect content to be readily available outside of wifi access points.

Many CDN infrastructures include an access network having a CDN component that delivers content to a user device, for example, via a wifi access point. However, users may change location or networks while consuming the content. For example, a user may begin watching a video using the access network (e.g., a wifi hotspot) and disconnect from the access network while continuing to watch the video. In doing so, the user device may become connected to a cellular network. Because the user began watching the video via the access network, the session is pinned to a server based on the location and network policies of the access network, which may no longer be the optimal server from which to serve the content due to the network change.

Stated differently, to begin consuming on-demand and live video, audio, or other media streaming, the user device fetches a manifest file, which generally includes a uniform resource locator (URL) or a sequence of uniform resource identifiers (URIs) that identifies the locations of consecutive segmented media files of the stream. The server from which the segments are served is determined based on the location of the user device using various policies implemented by the CDN. If the user device retrieves the manifest file using the access network, the server from which the segments are served is determined based, at least in part, on the location of the access network.

The user device downloads the segmented media files identified in the manifest file and presents the stream to the user. Because the user device is in the process of presenting the stream to the user, when the user disconnects from the access network and connects to another network, such as a cellular network, the user device does not re-fetch the manifest file. Accordingly, even though the network has changed, the CDN continues to direct the user device to retrieve the media segments from the original server designated based on the location of the access network, which may no longer be the optimal location from which to respond to requests from the user device.

It is with these observations in mind, among others, that various aspects of the present disclosure were conceived and developed.

SUMMARY

Implementations described and claimed herein address the foregoing problems, among others, by serving a manifest file as a series of subsets, thereby permitting a content delivery network to dynamically re-route requests for content segments based on changing locations or networks, changing network conditions, or the like. In one implementation, a request for content is received from a user device. A first manifest subset is provided using a network component in response to the request for content. The first manifest subset identifies a first set of one or more content segments and a second manifest subset. The first set of one or more content segments constitute a portion of the content, and the second manifest subset is identified at a tail of the first manifest subset. The first set of one or more content segments is served in response to separate requests. A request for the second manifest subset is received. The second manifest subset identifies a second set of one or more content segments.

Other implementations described and claimed herein address the foregoing problems, among others, by replacing a relative identifier with an absolute identifier to correct localization errors. In one implementation, an error in localization of a user device is identified using a network component. The localization causes the user device to be resolved to a first storage location in a network. The error in localization is remedied by replacing a relative identifier pointing to the first storage location with an absolute identifier pointing to a second storage location in the network.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
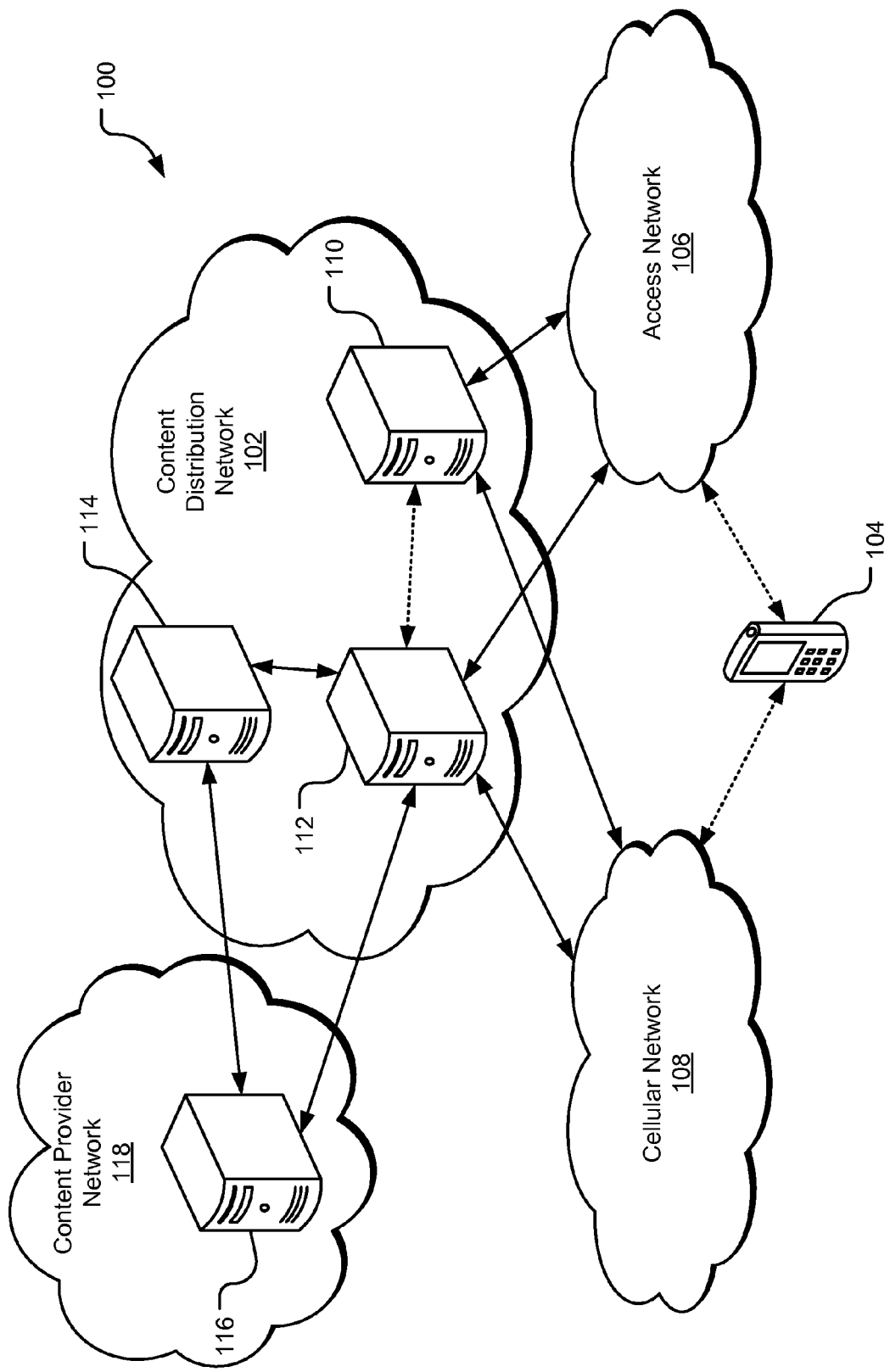
FIG. 1 is an example network environment for distributing content using a series of manifest subsets.

Aspects of the present disclosure involve systems and methods for dynamic re-localization and manifest chunking in a content delivery network (CDN). In one aspect, a manifest file is served as a series of subsets, thereby permitting the CDN to dynamically re-route requests for media segments based on changing locations or networks, changing network conditions (e.g., available network capacity), and the like.

For example, a user may wish to watch a movie through a website on a mobile phone connected to an access network via a wifi hotspot. To start the movie, a link in the website to the movie may be selected, which causes a request to be sent to a directory server in the CDN. The directory server responds to the request by providing a network address (e.g., Internet Protocol (IP) address) from which the movie may be retrieved. In doing so, the directory server determines a location from which to serve the movie based on the wifi hotspot and/or other network policies.

To enable the user to play the movie from various points (e.g., different chapters in the movie) the movie is split into segments or chunks, and each movie segment is served to the phone in response to a separate request. To retrieve the movie segments, a series of manifest subsets, each subset corresponding to one or more of the movie segments, is utilized. In response to the request for the movie, an identifier (e.g., a universal resource locator (URL)) to a first manifest subset is returned to the phone. The first manifest subset includes a series of identifiers pointing to location(s) from which a first set of corresponding movie segments may be retrieved. The phone requests the first movie segments in a sequence specified by the first manifest subset.

At the end of the sequence, the first manifest subset includes an identifier to a second manifest subset that causes a request to be sent to the directory server. The directory server responds to the request by providing a network address and determining location(s) from which to serve a second set of movie segments corresponding to the second manifest subset. Accordingly, if the user leaves the wifi hotspot and continues watching the movie on the phone via a cellular network, the directory server may change the location(s) from which the movie segments are served based on the cellular network and/or other network policies. The second manifest subset is returned the phone with a series of identifiers pointing to location(s) from which the second movie segments may be retrieved. The phone requests the second movie segments in a sequence specified by the second manifest subset.

The movie segments are played on the phone in a sequence specified by the series of manifest subsets. The phone will continue to retrieve manifest subsets and corresponding movie segments until the movie stops playing. From the perspective of the user, the movie is played continuously regardless of the change from the access network to the cellular network.

When the movie segments are requested and retrieved, relative URLs are generally used. The relative URLs point to each of the movie segments in relation to a base URL. As described above, in response to a request for a manifest subset, the directory server determines an appropriate location from which to serve the movie segments based on the location of the phone and other network policies, and a base URL to that location is provided to the phone. Once the base URL is received, relative paths will continue to be added onto the base URL to obtain subsequent movie segments corresponding to the retrieved manifest subset from the location determined by the directory server. Initial localization operations determine a location from which to serve the movie segments to the phone based on conventional localization algorithms and techniques. However, the initial localization operations performed by the directory server may suffer from a localization error, resulting in the movie segments being served from an inaccurate, erroneous, or otherwise inappropriate location. Thus, if the base URL points to an inappropriate location for serving the movie segments, utilizing a relative URL will result in the movie segments being served from the inappropriate location. Accordingly, in another aspect of the present disclosure, a relative URL is replaced with an absolute identifier to correct such localization errors.

For example, using the IP address of the phone, the CDN may determine the location of the phone. In doing so, the CDN may determine whether the initial localization operations failed and remedy the localization error at the application level by replacing the relative URL with an absolute URL. Using the absolute URL allows the phone to bypass the initial localization operations to retrieve the movie segments from an appropriate location by specifying a scheme identifying a protocol used to access the movie segments and the server hosting the content. As such, if the first manifest subset directs the phone to retrieve the movie segments from an inappropriate location, the second manifest subset may be returned with an absolute URL pointing to an appropriate location from which the second movie segments may be retrieved. Replacing a relative URL with an absolute URL is described in the context of content distribution and delivery. However, it will be understood that it may be applied in other contexts to remedy localization errors in a communication network.

For a detailed discussion of dynamic re-localization and manifest chunking in a content distribution network, reference is made of FIG. 1. As shown, an example network environment 100 for distributing content using a series of manifest subsets includes a CDN 102, which may include components one or more networks. In one implementation, the CDN 102 is communicably coupled to one or more access networks 106 and one or more cellular networks 108. The access network 106 and/or the cellular network 108 may be under the control of or operated/maintained by one or more entities, such as, for example, one or more Internet Service Providers (ISPs) or Mobile Network Operators (MNOs) that provide access to the CDN 102. Thus, for example, the access network 106 and the cellular network 108 may provide Internet access to a user device 104.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 or an intermediate device, for example, in the access network 106 or the cellular network 108. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, the content is split into segments or chunks of approximately two to ten second fragments, each of the content segments being served in response to a separate request. The content segments may be encoded at various bit rates, such that the user device 104 may request segments of an appropriate bit rate based on network conditions as the content is being presented on the user device 104. Segmentation of the content permits seeking to parts of the media (e.g., different chapters in a movie) without needing to download the entire content file.

In one implementation, to retrieve content segments from different storage locations in the network environment 100 and to configure and sequence the segments, a series of manifest subsets or chunks is utilized. Each of the manifest subsets corresponds to one or more content segments. The manifest subsets and the content segments may be fetched using a data transport protocol, including, but not limited to, File Transport Protocol (FTP), Hypertext Transport Protocol (HTTP), etc. The manifest subsets may be, for example, an Extensible Markup Language (XML) based files. Each of the manifest subsets includes a series of URLs pointing to the storage locations of the corresponding content segments. Stated differently, each of the manifest subsets specifies a relative URL to identify the location of corresponding content segments at each bit rate. Once a manifest subset is received, the user device 104 requests segments of the content of an appropriate bit rate (e.g., based on the rate at which the user device 104 is receiving the content data) in a sequence specified by the manifest subset as the presentation of the content progresses.

Splitting and serving the manifest file in subsets provides an opportunity to tune the CDN 102 in a variety of manners after a session presenting content on the user device 104 has begun. For example, even if the user device 104 disconnects from the access network 106 and connects to the cellular network 108 after a session starts, the user device 104 presents the content as a continuous stream with a substantially seamless change in networks from the user perspective. The location from which the content segments are served and the bit rates may be changed as each manifest subset is retrieved. As such, serving the manifest file in subsets may force re-localization using the directory server 110 if, for example, the user device 104 moves from the access network 106 to the cellular network 108. Each request for a manifest subset provides an opportunity to dynamically reroute the path or change the bit rate after a session has begun based on changing network topology (e.g., due to changing networks), changing network conditions (e.g., available network capacity), or changing locations.

In one implementation, after a session is initiated by requesting content using the user device 104, a URL to a first manifest subset is returned and an appropriate storage location (e.g., geographically or logically proximate) from which one or more first content segments associated with the first manifest subset may be retrieved is resolved through the CDN 102. The user device 104 requests the first content segments as specified by the first manifest subset. In one implementation, at the end of the first manifest subset, a URL to a second manifest subset is included that causes a request to be sent to the directory server 110.

Upon receiving the request for the second manifest subset, the directory server 110 provides a network address (e.g., an IP address) pointing to an edge cache cluster, one of the servers 110, 112, 114, or some other storage location from which a second set of content segments may be served as specified in the second manifest subset. Accordingly, if the user device 104 disconnects from the access network 106 and continues presenting the content on the user device 104 via the cellular network 108, the directory server 110 may change the location(s) from which the content segments are served based on the cellular network 108 and/or other network policies. The second manifest subset is returned the user device 104 with a series of URLs pointing to location(s) from which the second movie segments may be retrieved. In other words, the URLs in the second manifest subset corresponding to each of the second set of content segments are resolved to a network address from which the user device 104 may retrieve the content segments. The user device 104 requests the second movie segments in a sequence specified by the second manifest subset. The user device 104 will continue to retrieve manifest subsets and corresponding content segments until the session ends. With the retrieval of each manifest subset, there is an opportunity to change content retrieval parameters (e.g., the path through which the content is served, the bit rates, or other network or content delivery parameters).

Figure 2:
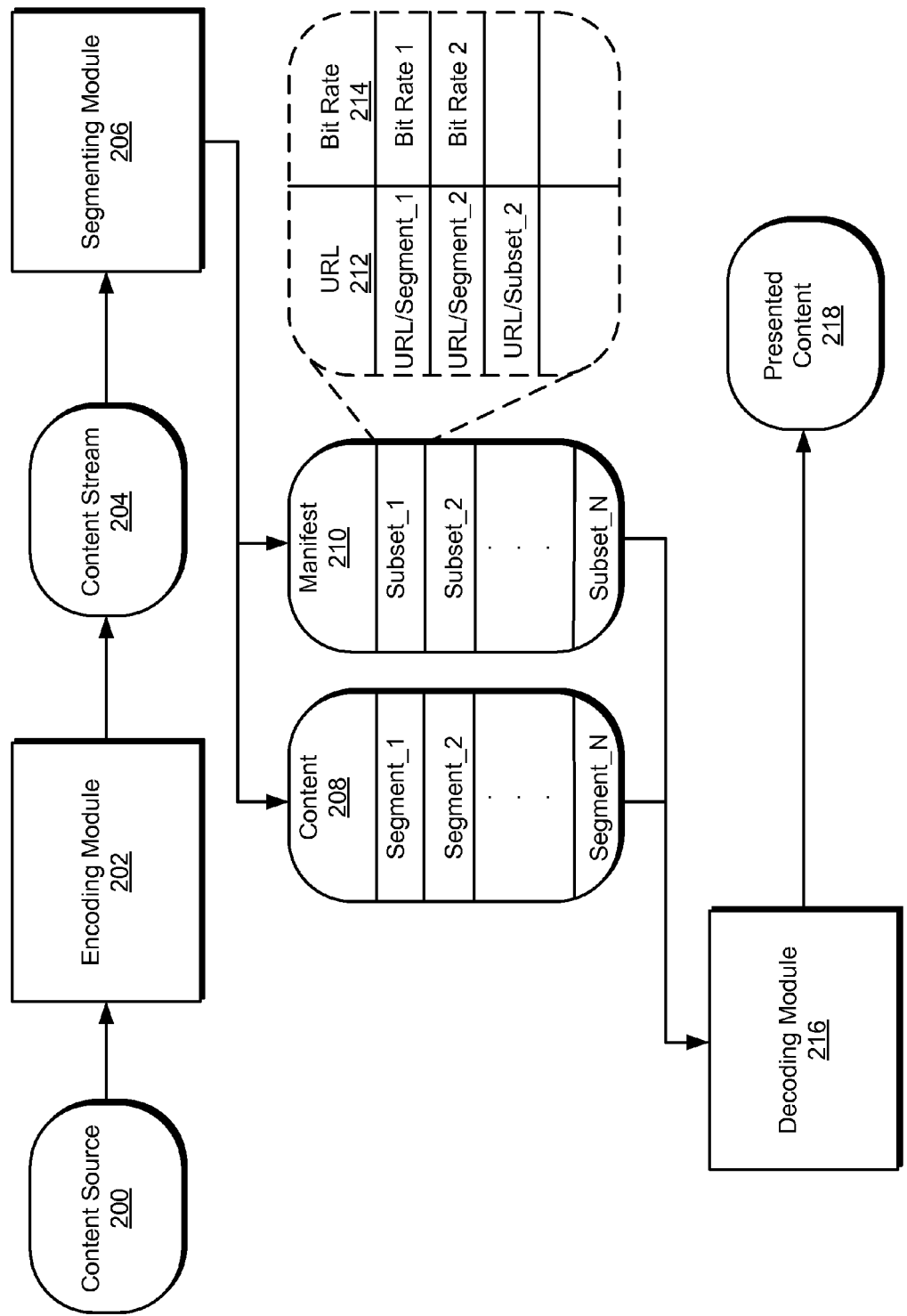
FIG. 2 illustrates a series of manifest file subsets, each identifying one or more content segments.

As can be understood from FIG. 2, in one implementation, after a user initiates a session on a user device (e.g., plays a video), a content encoding module 202 encodes content 200 into a transport stream 204, and a stream segmenting module 206 splits the stream 204 into content segments 208. The stream segmenting module 206 creates a series of manifest subsets 210, such that each of the manifest subsets 210 include one or more identifiers (e.g., URLs) identifying corresponding consecutive content segments 208. Each of the manifest subsets 210 may also include information about each of the corresponding content segments, including, without limitation, a bit rate of the content segment (e.g., in kilobits per second), a codec used to encode the content segment, a resolution of the content segment (e.g., in pixels), markers, frame rates (e.g., in frames per second), and captions.

In one implementation, in response to a request for content, the user device receives Subset_1 of the manifest subsets 210. As shown in FIG. 2, Subset_1 of the manifest subsets 210 includes one or more URLs 212 and information (e.g., bit rates 214) that identify how and where to locate a corresponding content segment. For example, Subset_1 identifies the URLs 212 and bit rates 214 corresponding to Segment_1 and Segment_2 of the content 208. The user device requests Segment_1 and Segment_2 of the content 208 in a sequence specified by Subset_1 of the manifest subsets 210. At the end of the sequence, the Subset_1 of the manifest subsets 210 includes a URL to a Subset_2 of the manifest subsets 210, which directs the user device to request the next consecutive content segments 208.

As the content segments 208 are requested, the content segments 208 are received into a memory buffer in the user device. A decoding module 216 decodes the content segments 208 for the user device to present or play content 218. Because previous data is not relied upon in decoding the content, the bit rate of the content may be changed without synchronization issues. The user device continues to request and receive the manifest subsets 210 and corresponding content segments 208 until the content 218 ends or the user terminates the session.

Figure 3:
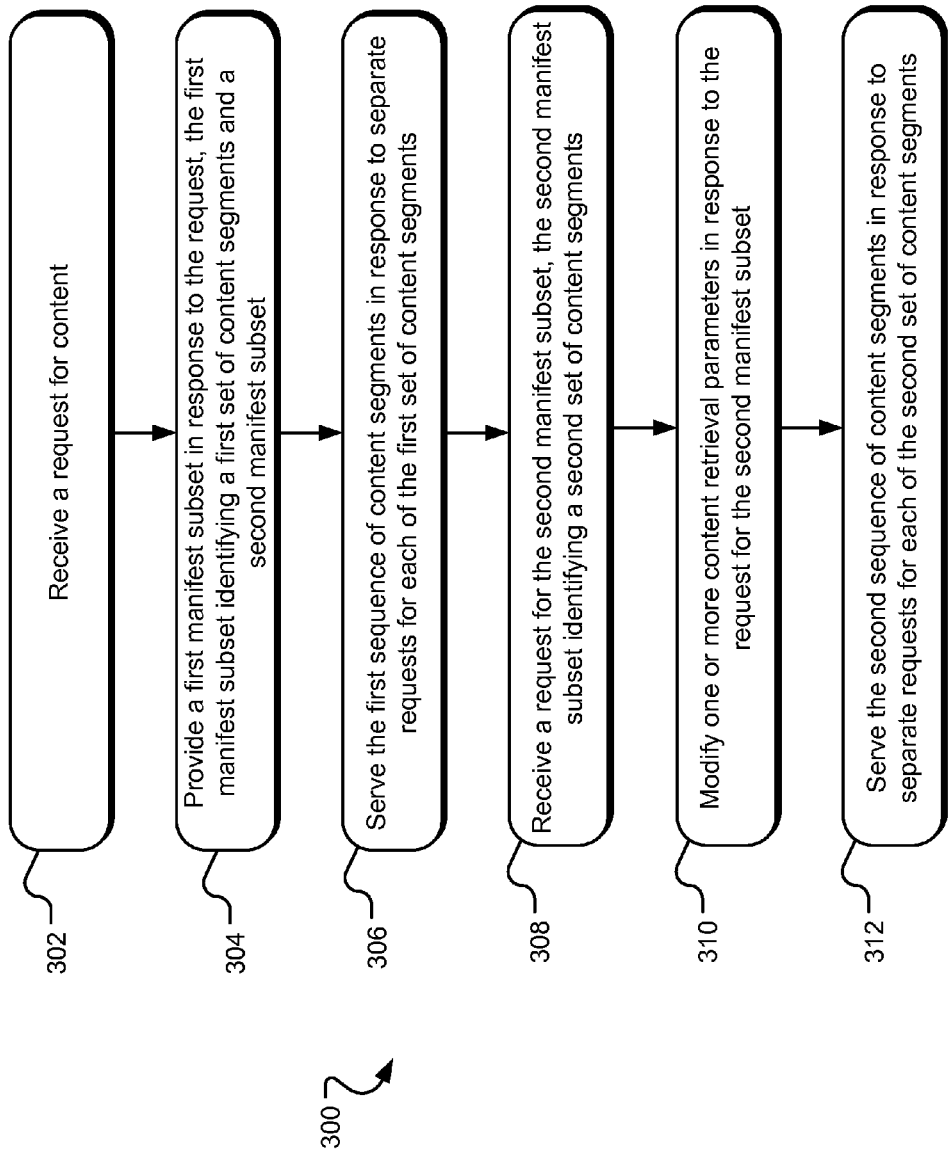
FIG. 3 illustrates example operations for distributing content using a series of manifest subsets.

Turning to FIG. 3, example operations 300 for distributing content using a series of manifest subsets are shown. In one implementation, a receiving operation 302 receives a request for content from a user device. The request may be generated upon selection or entering of a link to the content in an Internet application. Further, the request may specify a particular point in the content (e.g., a specific chapter in a movie) from which to present the content.

To retrieve one or more content segments corresponding to the request from storage location(s) in a network and to configure and sequence the segments, a providing operation 304 provides a first manifest subset using a network component. The first manifest identifies a first set of one or more content segments and a second manifest subset. In one implementation, the first manifest subset identifies the first set of content segments with one or more URLs pointing to the location(s) from which the content segments may be retrieved.

A serving operation 306 serves the first set of content segments in response to separate requests from the user device for each of the first set of content segments. The user device requests the first set of content segments in a sequence specified by the first manifest subset. Accordingly, in one implementation, the serving operation 306 serves the first set of content segments based on an order in which the first set of content segments are identified in the first manifest subset.

At the tail or otherwise at the end of the sequence of the identifiers, the first manifest subset includes an identifier to the second manifest subset. In one implementation, after the serving operation 306 serves each of the first set of content segments, a receiving operation 308 receives a request for the second manifest subset.

Upon the request for the second manifest subset, in one implementation, a modifying operation 310 modifies one or more content retrieval parameters. Stated differently, the modifying operation 310 may tune the network through which the content is delivered in a variety of manners in response to the request for the second manifest. For example, the modifying operation 310 may resolve the user device to a location from which to serve a second set of one or more content segments that is different from the location(s) from which the first set of content segments were served. Accordingly, if the user device changes networks or physical locations, the modifying operation 310 may change the location(s) from which the content segments are served based on the changed network, physical location, and/or other network policies. The modifying operation 310 may otherwise change the path through which content segments are served. Additionally, the modifying operation 310 may change the bit rate of the one or more of the content segments. Other content delivery changes or tuning of the network are also contemplated herein.

The second manifest subset is then provided to the user device based on the modified content retrieval parameters. The second manifest subset identifies a second set of one or more content segments. In one implementation, the second manifest subset identifies the second set of content segments with one or more URLs pointing to the location(s) from which the content segments may be retrieved. A serving operation 312 serves the second set of content segments in response to separate requests from the user device for each of the second set of content segments. The user device requests the second set of content segments in a sequence specified by the second manifest subset. Accordingly, in one implementation, the serving operation 312 serves the second set of content segments based on an order in which the second set of content segments are identified in the second manifest subset.

In another implementation, the providing operation 304 provides a localized URL to the second manifest subset with the first manifest subset. As such, the URL to the second manifest subset may be dynamically generated by the network component providing the first manifest subset based on a location of the user device. The corresponding content segments will be served as described herein upon separate requests from the user device.

The operations will repeat as necessary until each of the requested content segments has been served. Stated differently, manifest subsets and corresponding content segments will continue to be served until each of the content segments has been received by the user device. Further, the modifying operation 310 will modify one or more content retrieval parameters upon each request for a manifest subset as needed to tune the network and/or content delivery.

Figure 4:
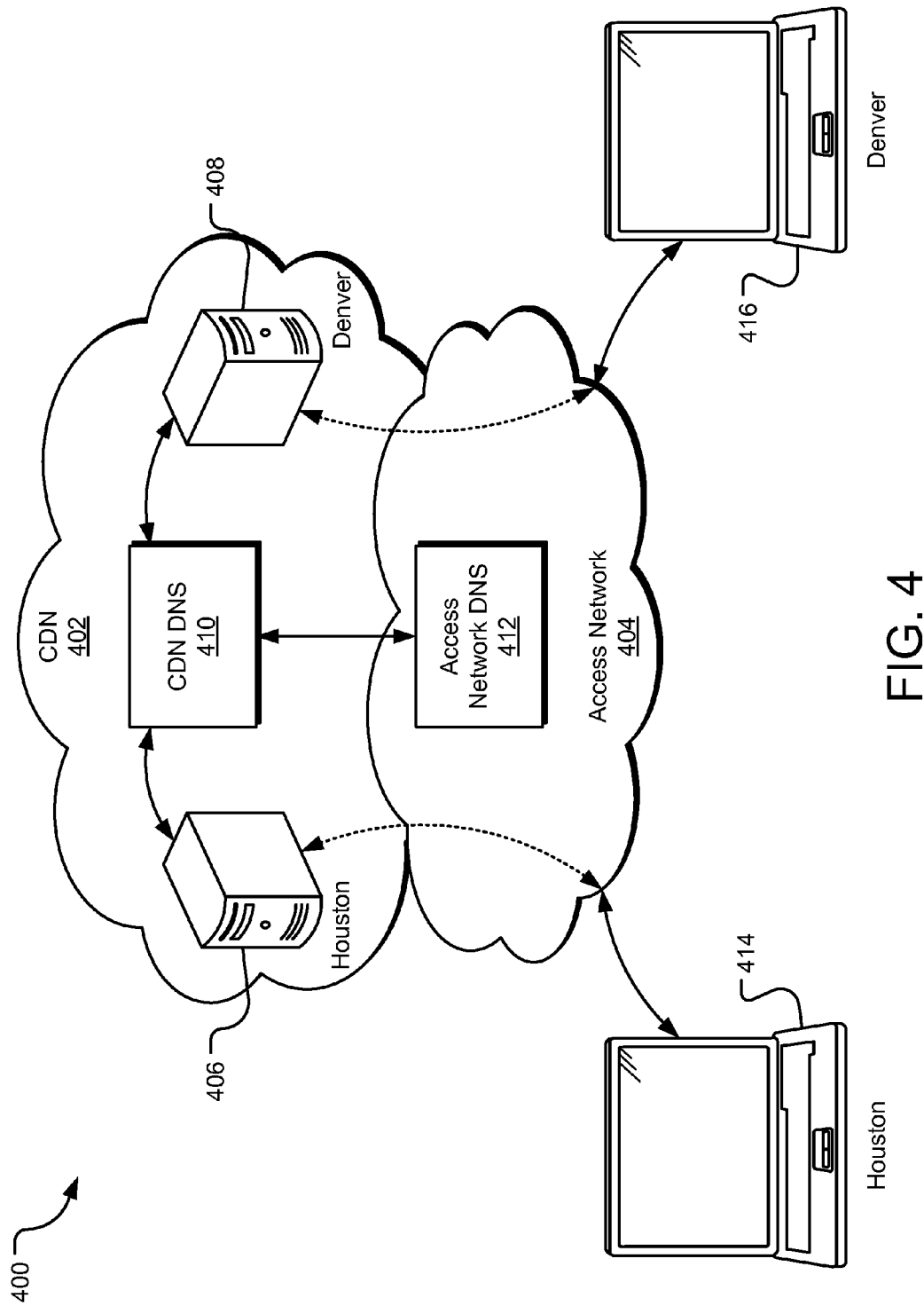
FIG. 4 displays an example network environment having a caching infrastructure that utilizes an absolute URL in a manifest file to correct localization errors.
Figure 5:
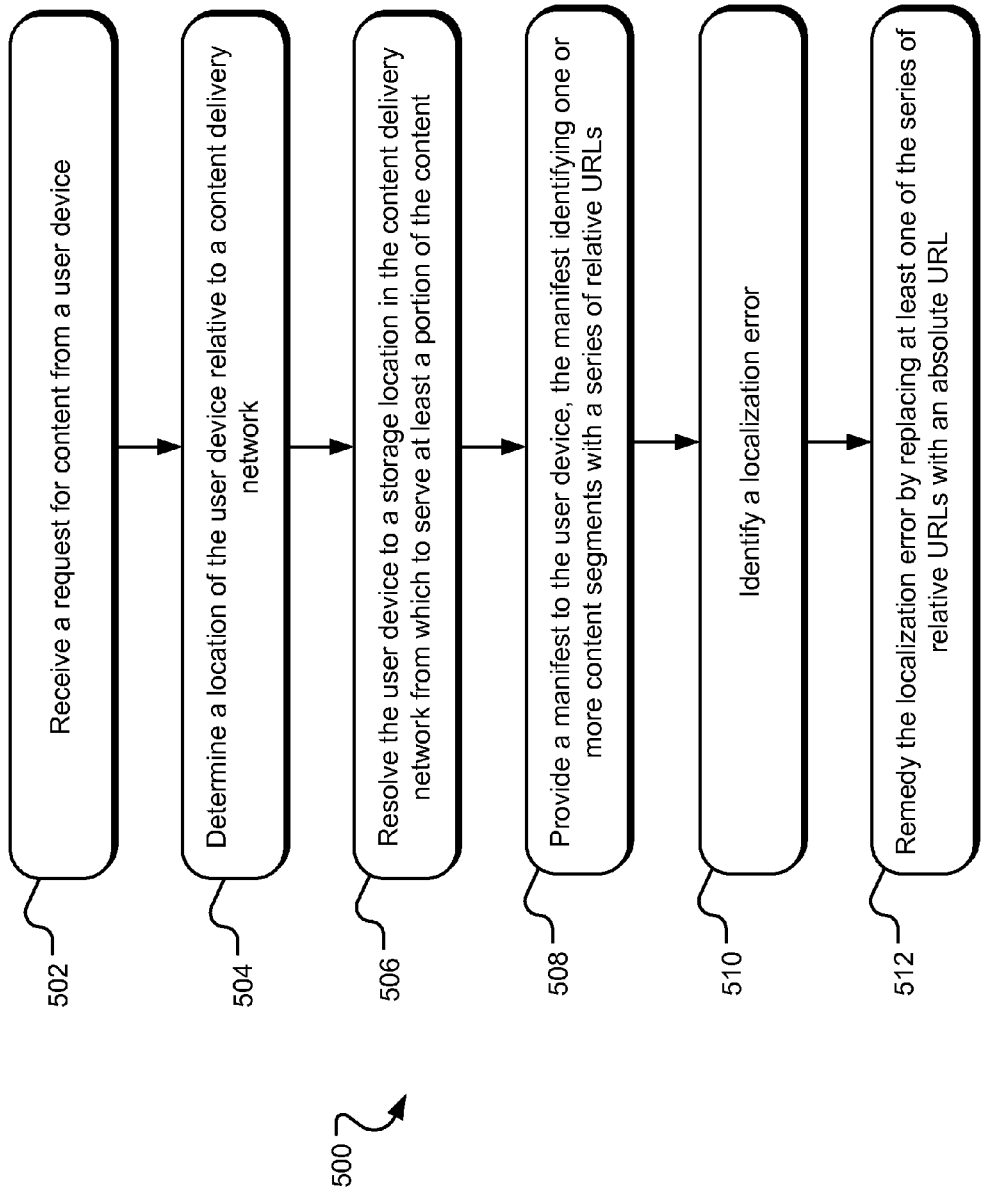
FIG. 5 illustrates example operations for correcting localization errors using an absolute URL.

As can be understood from FIGS. 1-3, the example operations 300 may be used to tune a network or content delivery parameters in a variety of manner after a session presenting content has begun. Turning to FIGS. 4-5, it will be appreciated that localization errors may be additionally remedied at the application protocol level (e.g., hypertext transfer protocol level) by replacing a relative identifier with an absolute identifier.

FIG. 4 displays an example network environment 400 having a caching infrastructure that utilizes an absolute URL in a manifest file to correct localization errors. In one implementation, the network environment 400 includes one or more content delivery networks (CDN) 402 for delivery of content from one or more content providers to end-users. The CDN 402 is communicably coupled to one or more access networks 404 that provide access to the Internet for end-users and/or content providers.

The one or more CDNs 402 may each have CDN caches located in various locations (both physical and logical), for example, a Houston cache cluster 406 and a Denver cache cluster 408. The network environment 400 may further include cache devices on the client/subscriber side of the access networks 404, which may be referred to as "deep caches," "shared caches," or "local caches," providing the opportunity to retrieve content without having to communicate with storage devices across the access networks 404. Each such cache device may be shared amongst proximally located end-users, for example, via wired access or a wifi access point.

In one implementation, the CDN 402 includes a CDN domain name system (DNS) 410 that is communicably coupled to the Houston cache cluster 406 and the Denver cache cluster 408, for example, across the Internet. The CDN DNS 410 includes one or more directory servers, as described herein, that determine at least one appropriate CDN cache for delivering requested content to end-users. In one implementation, the access network 404 includes an access network DNS 412 having one or more directory servers, as described herein. The access network DNS 412 is configured to interact with the CDN DNS 410 to provide end-users of the access network 404 access to the CDN 402 to request and retrieve content.

As described herein, content has a network address (e.g., an IP address) that may be encoded by a URL. An absolute URL includes: a scheme identifying a protocol used to access the content; a name of the server hosting the content; and the name of the content given as a path. A relative URL does not contain the protocol or server information. Instead, relative URLs are resolved to full URLs using a base URL. Stated differently, a relative URL points to a file in relation to a present file. For example, a relative URL to a first segment of content may be "base_URL/segment_1"

When requesting and receiving content, often manifest files utilize relative URLs. When using a relative URL, the CDN DNS 410, alone or in conjunction with the access network DNS 412, resolves a user device (e.g., user devices 414 or 416) to at least one of the CDN caches 406 and 408 in response to a request for content. Generally, the user device 414 or 416 is resolved to an appropriate CDN cache based on the location of the user device 414 or 416 or other network policies. For example, if the user device 414 is located in Houston, it may be resolved to the Houston cache cluster 406, and if the user device 416 is located in Denver, it may be resolved to the Denver cache cluster 408. Once a base URL is received, relative paths will continue to be added onto the base URL to obtain subsequent content segments.

Accordingly, if a user device is resolved to an inappropriate location with respect to the base URL, utilizing a relative URL will result in each of the subsequent content segments being retrieved from that location. For example, if the Houston user device 414 is erroneously resolved to the Denver cache cluster 408 in response to a request for content, a relative URL will result in content segments continuing to be served to the Houston user device 414 from the Denver cache cluster 408.

In one implementation, where the initial localization performed by the CDN DNS 410 and/or the access network DNS 412 is determined (e.g., using the IP address) to be inaccurate, erroneous, or otherwise inappropriate, the relative URL in the manifest file is replaced with an absolute URL during the resolution process. Replacing the relative URL with an absolute URL forces the content segments to be served from an appropriate (e.g., local) server. For example, to correct the localization error in the example described above, the relative URL in the manifest file may be replaced with an absolute URL directing the Houston cache cluster 406 rather than the Denver cache cluster 408 to serve content segments to the Houston user device 414.

Where the manifest file is split into subsets, the URL to the next manifest file subset may be a relative URL after the initial localization is performed by he CDN DNS 410 and/or the access network DNS 412. After the first manifest file subset and corresponding content segments are returned to a user device, the relative URL may be replaced with an absolute URL for subsequent manifest file subsets and corresponding content segments if it is determined that the content should be served from a different server. Accordingly, localization errors may be corrected without interrupting data playback or content presentation.

FIG. 5 illustrates example operations 500 for correcting localization errors using an absolute URL. In one implementation, a receiving operation 502 receives a request for content, a content segment, or other resource from a user device. A determining operation 504 determines a location of the user device relative to a content delivery network using conventional localization algorithms or techniques. A resolving operation 506 resolves the user device to an appropriate location from which to serve the requested content based on the determining operation 504 and/or a physical location of the user device, a network to which the user device is connected, and other network policies.

A providing operation 508 provides a manifest to the user device. In one implementation, the providing operation 508 provides a manifest or manifest subset identifying one or more content segments with a series of relative URLs. The relative URLs point to each of the content segments in relation to a base URL. Accordingly, once the base URL is received, relative paths will continue to be added onto the base URL to obtain subsequent content segments based on the determining operation 506.

An identifying operation 510 identifies whether the determining operation 504 or resolving operation 506 suffered from a localization error, resulting in the content segments being served from an inaccurate, erroneous, or otherwise inappropriate location. If the identifying operation 510 identifies no localization error, the providing operation 508 may continue to provide manifest subsets and/or content segments to the user device according to the resolving operation 506 upon request from the user device. If the identifying operation 510 identifies an error in the determining operation 504 or resolving operation 506 (e.g., using the IP address of the user device), a remedying operation 512 remedies the localization error.

In one implementation, the remedying operation 512 remedies the localization error at the application level by replacing the relative URL with an absolute URL. Using the absolute URL allows the user device to bypass the determining operation 504, such that the resolving operation 506 is directed to an appropriate storage location specified by the absolute URL from which to retrieve the content segments. Stated differently, the remedying operation 512 specifies a scheme identifying a protocol used to access the content segment(s) and the server hosting the content segment(s).

Accordingly, the retrieval of each manifest subset, as described herein, provides an opportunity not only to tune the content delivery network and/or content delivery parameters, but also to correct localization errors. As such, if the first manifest subset directs a user device to retrieve content segments from an inappropriate location, a second manifest subset may be returned with an absolute URL pointing to an appropriate location from which second content segments may be retrieved. Replacing a relative URL with an absolute URL is described in the context of content distribution and delivery. However, it will be understood that it may be applied in other contexts to remedy localization errors in a communication network.

Figure 6:
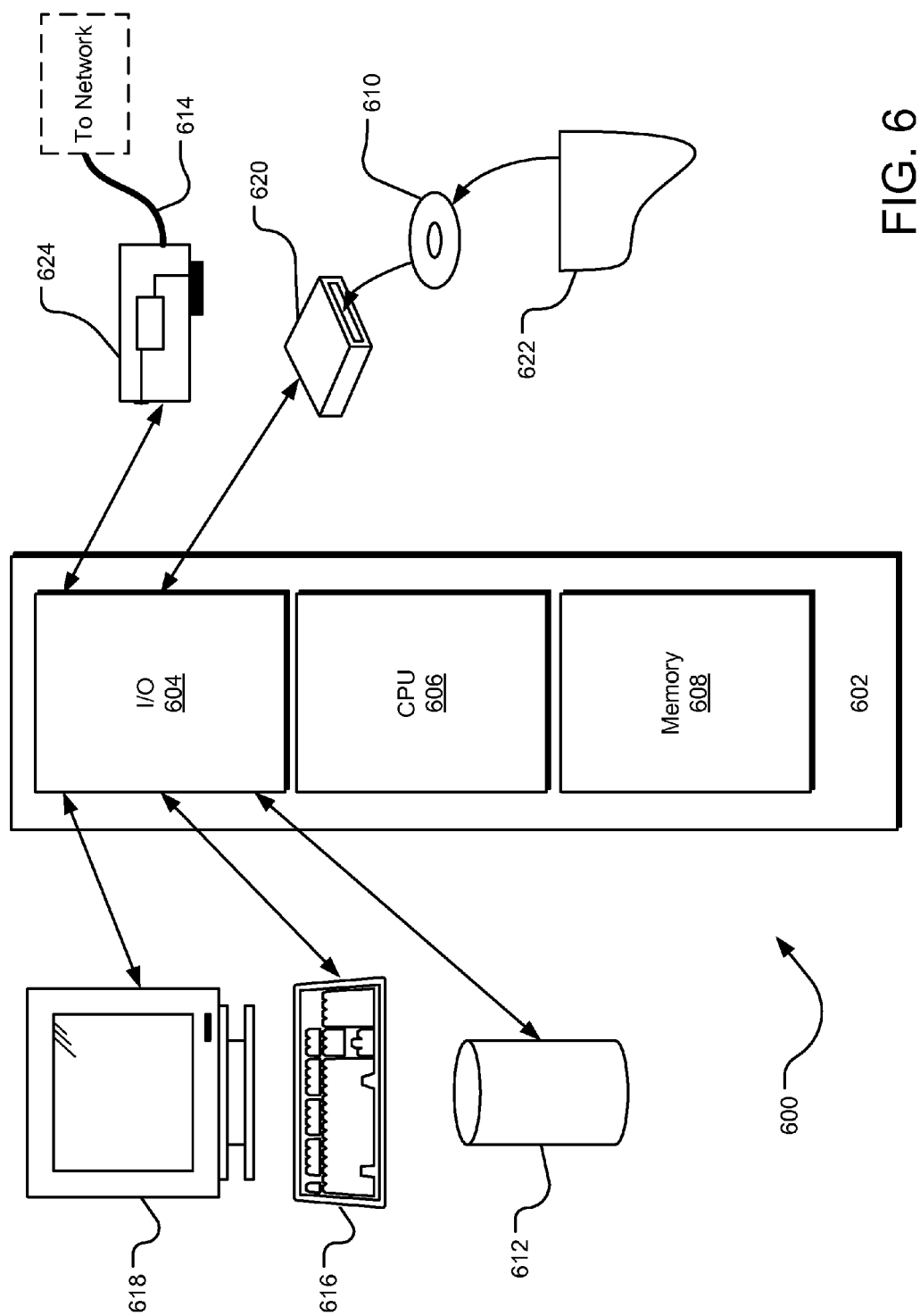
FIG. 6 is an example of a computing system that may implement various systems and methods discussed herein.

Referring to FIG. 6, a detailed description of an example computing system 600 that may implement various systems and methods discussed herein is provided. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The I/O section 604 is connected to one or more user-interface devices (e.g., a keyboard 616 and a display unit 618), a disc storage unit 612, and a disc drive unit 620. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 604, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by a floppy drive unit, a tape drive unit, or other storage medium drive unit. The network adapter 624 is capable of connecting the computer system 600 to a network via the network link 614, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, manifest file subsets and corresponding content segments, a plurality of internal and external databases, source databases, and/or cached data on servers are stored as the memory 608 or other storage systems, such as the disk storage unit 612 or the DVD/CD-ROM medium 610, and/or other external storage devices made available and accessible via a network architecture. Content streaming, distribution, and delivery software and other modules and services may be embodied by instructions stored on such storage systems and executed by the processor 602.

Some or all of the operations described herein may be performed by the processor 602. Further, local computing systems, remote data sources and/or services, and other associated logic represent firmware, hardware, and/or software configured to control operations of the CDN 102, the user devices 104, 414, or 416, and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 602 and a user may interact with a Graphical User Interface (GUI) using one or more user-interface devices (e.g., the keyboard 616, the display unit 618, and the user devices 604) with some of the data in use directly coming from online sources and data stores. The system set forth in FIG. 6 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   receiving a request for content from a user device;
   providing a first manifest subset using a network component in response to the request for content, the first manifest subset identifying a first set of one or more content segments and a second manifest subset, the first set of one or more content segments constituting a portion of the content, the second manifest subset being identified at a tail of the first manifest subset;
   serving the first set of one or more content segments in response to separate requests; and
   receiving a request for the second manifest subset, the second manifest subset identifying a second set of one or more content segments.

2. The method of claim 1, further comprising:
   modifying one or more content retrieval parameters in response to the request for the second manifest subset.

3. The method of claim 2, wherein the one or more content retrieval parameters includes changing a bit rate of at least one of the content segments in the second set.

4. The method of claim 2, wherein the one or more content retrieval parameters includes changing a path through which at least one of the content segments in the second set is served.

5. The method of claim 2, further comprising:
   serving at least one of the content segments in the second set based on the modified content retrieval parameters.

6. The method of claim 1, wherein at least one of the content segments in the first or second set is served over an access network.

7. The method of claim 1, wherein at least one of the content segments in the first or second set is served over a cellular network.

8. The method of claim 1, wherein the content is a video.

9. The method of claim 1, wherein the second manifest subset is identified with a uniform resource locator dynamically generated by the network component.

10. A system for delivering content to a user device, the system comprising:
    a network component device located in a path between a content source and the user device, the network component device configured to:
    provide a first manifest subset to the user device in response to a request for the content, the first manifest subset identifying a first set of one or more content segments and a second manifest subset, the first set of one or more content segments constituting a portion of the content, the second manifest subset being identified at a tail of the first manifest subset;
    serve the first set of one or more content segments in response to separate requests; and
    receive a request for the second manifest subset, the second manifest subset identifying a second set of one or more content segments.

11. The system of claim 10, wherein the one or more content segments and the second manifest subset are identified with one or more uniform resource locators.

12. The system of claim 10, wherein the content is a video.

13. The system of claim 10, wherein the network component is further configured to modify one or more content retrieval parameters in response to a request for the second manifest subset, the second manifest subset identifying one or more second content segments.

14. The system of claim 13, wherein the one or more content retrieval parameters includes changing a path through which at least one of the second content segments is served.

15. The system of claim 9, wherein the second manifest subset is identified with a uniform resource locator dynamically generated by the network component.

16. A method comprising:
    requesting content;
    receiving a first manifest subset from a network component in response to the request for content, the first manifest subset identifying a first set of one or more content segments and a second manifest subset, the first set of one or more content segments constituting a portion of the content, the second manifest subset being identified at a tail of the first manifest subset;
    requesting at least one of the first set of one or more content segments based on the first manifest subset;
    receiving the requested content segments; and
    requesting the second manifest subset, the second manifest subset identifying a second set of one or more content segments.

17. The method of claim 16, wherein at least one of the content segments in the first or second set is received over an access network.

18. The method of claim 17, wherein at least one of the content segments in the first or second set is received over a cellular network.

19. The method of claim 16, wherein the content is a video.

* * * * *